Figure 1:
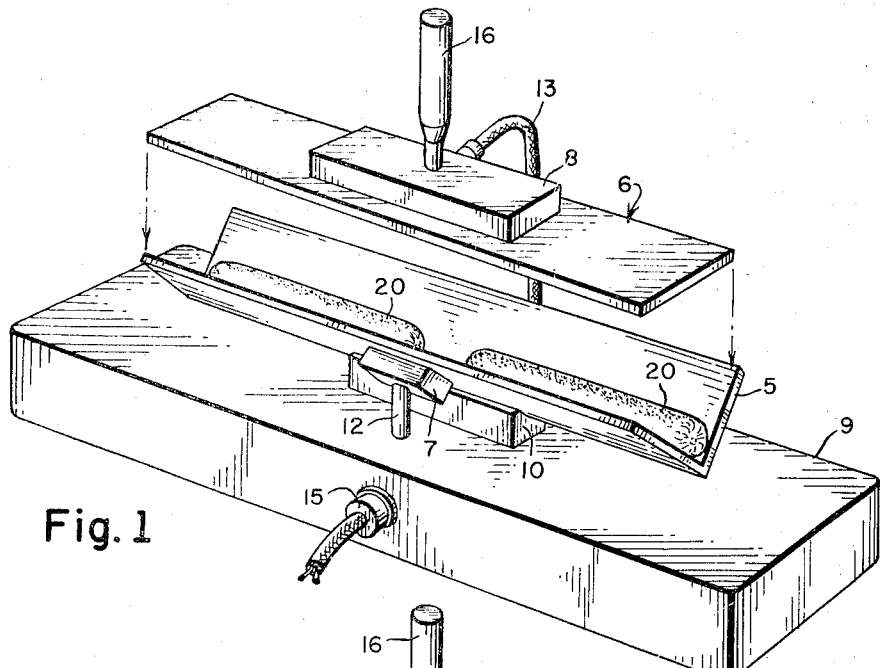

Jan. 23, 1968  F. W. JAMISON  3,364,846
HOT DOG GRILL
Filed June 14, 1966

INVENTOR.
FRED W. JAMISON

BY James N. Cyles
ATTORNEY

കുറച്ച്...

United States Patent Office 3,364,846
Patented Jan. 23, 1968

3,364,846
HOT DOG GRILL
Fred W. Jamison, 1226 Holy Cross Drive,
Monroeville, Pa. 15146
Filed June 14, 1966, Ser. No. 557,445
2 Claims. (Cl. 99—422)

This invention relates to a hot dog grill for simultaneously cooking two hot dogs, one in each end of the device.

The device includes a metallic trough of V-shape, open at its opposite ends and with the trough being covered by a metallic plate.

The invention further contemplates a sheet metal base housing having a thermostat fixed to its upper side and with trough being supported upon the top of the thermostat and with the side walls of the trough and the cover plate having heater elements fixed thereto and connected to a source of electricity to heat the walls of the trough and the cover plate so as to thoroughly cook hot dogs that lie within the V-shaped trough.

Novel features of construction and operation of the device will be more clearly set forth during the course of the following description, reference being had to the accompanying drawings, wherein has been illustrated a preferred form of the invention and wherein like characters of reference refer to like parts throughout the several figures.

Figure 2:
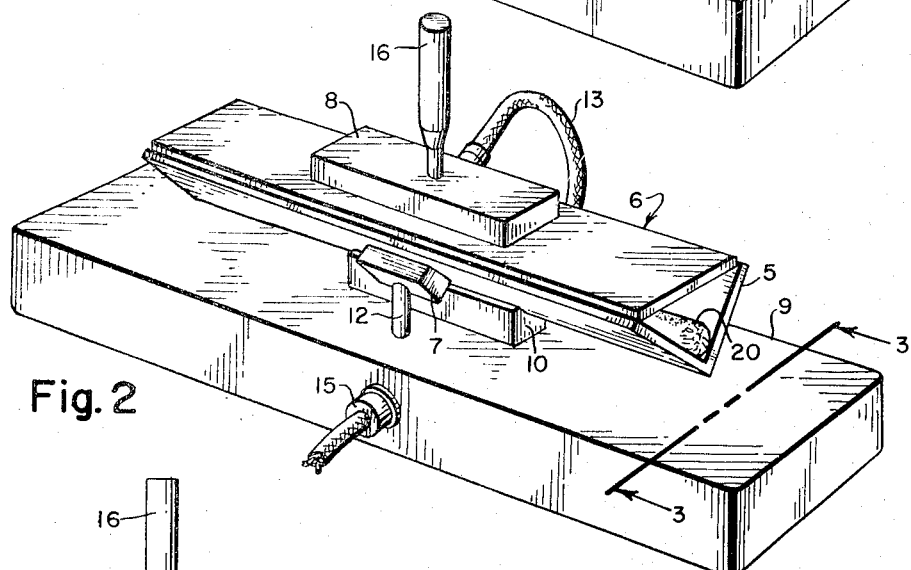
Figure 3:
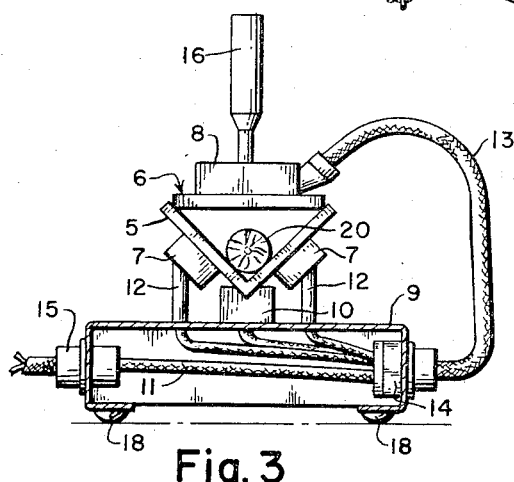

In the drawings:

FIGURE 1 is a perspective view of a grill constructed in accordance with the invention and with a cover plate being shifted upwardly to expose the hot dogs after cooking, FIGURE 2 is a similar view, but with the cover plate disposed upon the trough and, FIGURE 3 is a transverse section, taken substantially on line 3—3 of FIG. 2.

Referring specifically to the drawings, there has been illustrated a metallic V-shaped trough 5, open at its opposite ends and into which hot dogs are disposed. The hot dogs are indicated at 20. With the hot dogs arranged in the bottom of the trough, they are enclosed in the trough by a metallic cover plate 6. The trough 5 and the cover plate are formed of relatively thick metal, calculated to retain heat and to thoroughly cook the hot dogs.

Fixed to the outer side walls of the trough 5, are heater elements 7 and fixed to the top side of the cover plate 6 is a heater element 8.

A base housing 9 of sheet metal is provided upon its top with a thermostat 10 and the trough 5 seats upon the thermostat and with the heater elements 7 being connected to the housing by tubular supports 12, through which electrical conductors lead to a terminal panel 14 within the housing. A plug 15 connected to a source of electrical energy leads to the panel 14 by a conductor 11 and heater elements 7 and 8 are connected to the panel by separate conductors, a flexible conductor 13 connects the heater element 8 with the terminal panel 14.

The element 8 is provided with an upstanding handle 16 whereby the cover plate 6 may be lifted when the hot dogs are to be removed. The base housing 9 is flanged at its bottom and carries cushion legs 18.

In the use of the grill, the plug 15 is plugged into its socket and energizes the wiring leading from the panel 14, conducting electricity to the elements 7 and 8 and heating the trough and the cover plate, the temperature being regulated by the thermostat. After thorough cooking, the cover plate 6 is lifted upwardly and the hot dogs removed. In preparing the hot dogs for cooking, a pointed stick is inserted into the outer end of the hot dog to form a handle and disposed upon the handle of the hot dog is a cardboard disc having the trade mark Dunkin Dog printed thereon. The hot dog is then held by its handle and dipped into a suitable sauce.

It is to be understood, that the invention is not limited to the precise structure shown, but that changes are contemplated as readily fall within the scope of the appended claims.

Having described my invention, what I claim as new and desire to obtain by Letters Patent is:

1. A grill for cooking hot dogs or similar food products that comprises a hollow base housing, a thermostat fixed to the top surface of the housing, a V-shaped trough disposed upon the surface of the thermostat, a cover plate adapted to overlie the trough and for enclosing at least two hot dogs that extend inwardly from the ends of the trough, a heater element fixed to the cover plate and heater elements fixed to the outer sides of the walls of the trough, the trough and the cover plate being formed of relatively thick metal and to absorb heat from the heater elements, a handle fixed to the heater element of the cover plate whereby the cover plate may be lifted from the trough, the housing having a terminal bar fixed therein that is connected to a source of electrical energy and electrical conductors leading from the terminal bar to the several heater elements of the thermostat.

2. A grill as defined in claim 1, wherein the housing is flanged at its bottom for the reception of supporting cushion legs, the heater element for the cover plate being connected to the terminal bar by flexible conductor whereby to permit the cover plate to be lifted from the trough, the handle being formed of a non-metallic material to prevent the burning of the hand of an operator, one end of the flexible conductor being connected to the heater element of the cover plate and adapted to be plugged into the connection with the terminal bar at its opposite end and a plug for the source of energy being plugged into the housing.

References Cited

UNITED STATES PATENTS

| | | | |
|---|---|---|---|
| 1,870,735 | 8/1932 | Jones et al. | 99—441 XR |
| 2,044,615 | 6/1936 | Kennedy | 99—384 |
| 2,080,171 | 5/1937 | Fairbanks et al. | 99—425 XR |
| 2,125,471 | 8/1938 | Nelson | 99—358 XR |
| 2,804,530 | 8/1957 | McGuinness | 99—441 XR |

WILLIAM I. PRICE, Primary Examiner.

J. M. NEARY, Assistant Examiner.